United States Patent
Brill et al.

(10) Patent No.: US 6,937,651 B1
(45) Date of Patent: Aug. 30, 2005

(54) METHOD AND APPARATUS FOR COMPRESSING IMAGE INFORMATION

(75) Inventors: Frank Z. Brill, Plano, TX (US); Bruce E. Flinchbaugh, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 834 days.

(21) Appl. No.: 09/338,202

(22) Filed: Jun. 22, 1999

Related U.S. Application Data

(60) Provisional application No. 60/091,263, filed on Jun. 29, 1998.

(51) Int. Cl.[7] .............................................. H04B 1/66
(52) U.S. Cl. .................................................... 375/240
(58) Field of Search ............................... 348/143, 146, 348/149, 150, 151, 152, 155, 159, 160, 169, 140, 141; 382/118, 115, 116; 375/240.01, 240; H04B 1/66

(56) References Cited

U.S. PATENT DOCUMENTS

| | | | | |
|---|---|---|---|---|
| 4,943,854 A | | 7/1990 | Shiota et al. ................ | 358/108 |
| 5,111,291 A | | 5/1992 | Erickson et al. ............ | 358/408 |
| 5,491,511 A | | 2/1996 | Odle ........................... | 349/153 |
| 5,521,634 A | * | 5/1996 | McGary ...................... | 348/169 |
| 5,751,378 A | * | 5/1998 | Chen et al. .................. | 348/700 |
| 5,775,806 A | * | 7/1998 | Allred .......................... | 374/124 |
| 5,956,424 A | * | 9/1999 | Wootton et al. ............. | 382/192 |
| 5,969,755 A | * | 10/1999 | Courtney .................... | 348/143 |
| 5,995,671 A | * | 11/1999 | Nagarajan et al. .......... | 382/242 |
| 6,016,147 A | * | 1/2000 | Grantt ......................... | 345/420 |
| 6,069,655 A | * | 5/2000 | Seeley et al. ................ | 348/154 |
| 6,097,429 A | * | 8/2000 | Seeley et al. ................ | 348/154 |
| 6,115,420 A | * | 9/2000 | Wang .......................... | 375/240 |
| 6,128,341 A | * | 10/2000 | Kwak .......................... | 375/240 |
| 6,130,964 A | * | 10/2000 | Marques et al. ............ | 382/236 |
| 6,141,434 A | * | 10/2000 | Christian et al. ........... | 382/103 |

OTHER PUBLICATIONS

U.S. Appl. No. 08/795,423, filed Feb. 5, 1997 (TI–21441) (not included).
U.S. Appl. No. 08/866,789, filed May 30, 1997 (TI–22548) (not included).
Courtney, Jonathan D., *Automatic Video Indexing via Object Motion Analysis*, Pattern Recognition, Apr., 1997, cover page and pp. 1–31.
Niyogi, et al., *Analyzing and Recognizing Walking Figures in XYT*, 1994 IEEE, pp. 469–474.
Wren, et al., *Pfinder: Real–Time Tracking of the Human Body*, MIT Media Lab Perceptual Computing Section Technical Report No. 353, published in SPIE 1995, vol. 2615, pp. 1–9.

(Continued)

*Primary Examiner*—Tung T. Vo
(74) *Attorney, Agent, or Firm*—Robert D. Marshall, Jr.; W. James Brady, III; Frederick J. Telecky, Jr.

(57) ABSTRACT

A system (10) includes an image detector (12) which is a video camera, and which detects and outputs a succession of video images of a selected subject. A technique for processing these images involves preparing compressed image information. The compressed image information includes a first detected image (FIG. 2A) that serves as a reference image, includes information (FIG. 2G) identifying regions of subsequent detected images that differ from the first image, and excludes at least a portion of each of the subsequent images. The information identifying regions of subsequent detected images is free of contrast information for a substantial portion of each of those regions. The compressed image information for a given image is decompressed by displaying the reference image and by modifying the displayed reference image based on the information identifying differences from the reference image.

26 Claims, 2 Drawing Sheets

OTHER PUBLICATIONS

Turk, et al., *Eigenfaces for Recognition*, 1991 Mass. Institute of Technology, Journal of Cognitive Neuroscience, vol. 3, No. 1, pp. 71–86.

Flinchbaugh, Bruce, et al., *Autonomous Scene Monitoring System*, pp. 205–209.

Norris, et al., *Algorithmic Surveillance—The Future of Automated Visual Surveillance*, CCTV, Surveillance and Social Control Conf., Jul. 9, 1996, pp. 1–21.

Courtney, Jonathan D., *Automatic Object-Based Indexing for Assisted Analysis of Video Data*, 1995, pp. 1–25.

Flinchbaugh, Bruce, *Robust Video Motion Detection and Event Recognition*, May 11, 1997, pp. 51–54.

Rao, Kashipati, *A Computer-System to Detect 3-D Rectangular Solids*, 6 unnumbered pages.

Jain, et al., *Segmentation Through the Detection of Changes Due to Motion*, Computer Graphics and Image Processing 11, 1979, pp. 13–34.

*DTS-1000 DTS-1000VB Video Motion Detection & Tracking System*, Stellar Security Products Incorporated, 4 unnumbered pages, 1995.

Olson, et al., *Moving Object Detection and Event Recognition Algorithms for Smart Cameras*, May 11, 1997, pp. 159–175.

\* cited by examiner

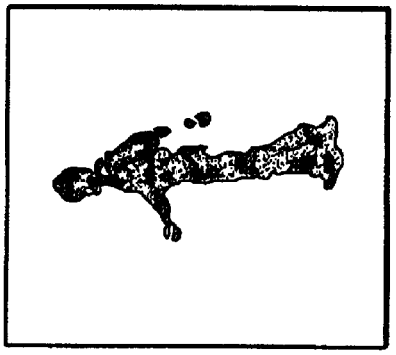
FIG. 2D
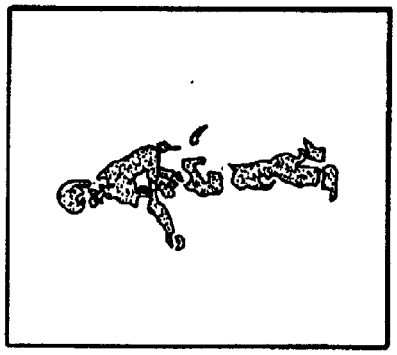
FIG. 2C
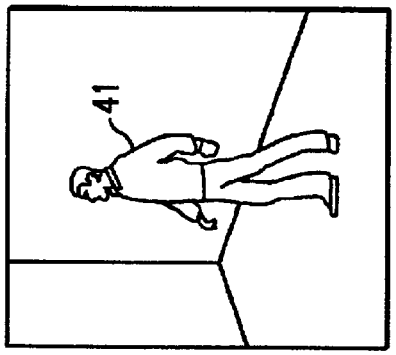
FIG. 2B
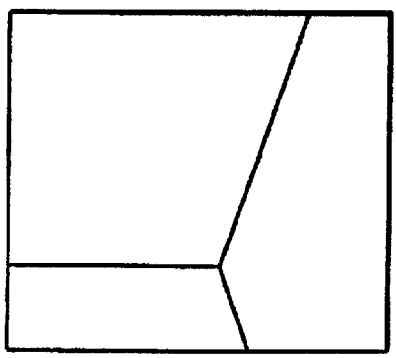
FIG. 2A
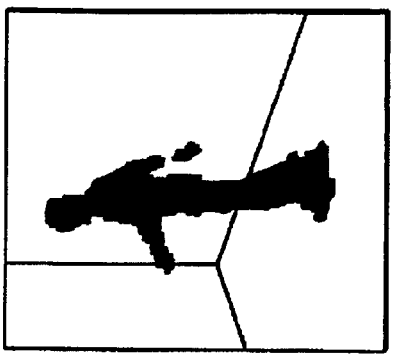
FIG. 3
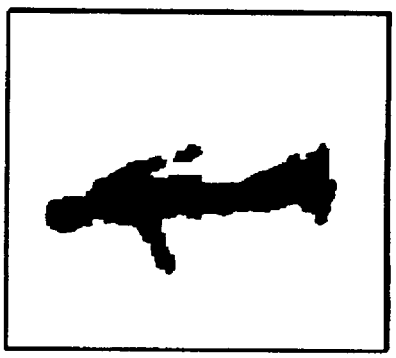
FIG. 2G
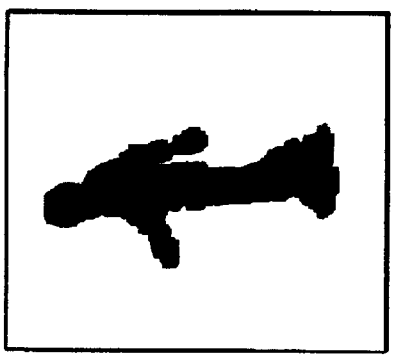
FIG. 2F
FIG. 2E

METHOD AND APPARATUS FOR COMPRESSING IMAGE INFORMATION

This application claims priority under 35 USC §119(e)(1) of Provisional Application No. 60/091,263, filed Jun. 29, 1998.

TECHNICAL FIELD OF THE INVENTION

This invention relates in general to compression of image information and, more particularly, to compression of image information in the context of a surveillance or monitoring application.

BACKGROUND OF THE INVENTION

Surveillance cameras are widely used as an aid in providing physical security for employees and property, for example in commercial, industrial and government facilities. In many instances, the images from a camera are simply viewed in real time by security guards at a central location.

It is also common to record the output of each camera using some suitable storage device, such as a video cassette record (VCR). In the event of a problem or security incident, the saved video information can then be examined. However, video surveillance applications can generate thousands of hours of video information, and a large amount of storage capacity is needed to save all of this video information. Similarly, a large bandwith is needed in order to transmit all of this video information to a remote location. There are some existing techniques which can be used to reduce the amount of information which must be saved or transmitted.

One approach is to use temporal sampling, such as time-lapse video recording. In essence, some of the detected video images are simply discarded, in order to reduce the overall amount of information which must be stored. As one example, every tenth or twentieth image would be selected for storage, and all other images would be discarded. This approach does have the advantage of reducing the amount of information which must be saved. However, a disadvantage is that the saved information is not sufficiently complete to allow accurate automated object tracking using known motion segmentation techniques.

A different approach involves spatial sampling, in order to reduce the resolution of the image information which is saved. For example, every detected image may be subsampled, in order to significantly reduce the total number of pixels for that image. By saving each image in a reduced resolution format, the total amount of image information which must be saved is reduced. A disadvantage is that the spatial resolution is uniformly low in each image, and thus throughout the video sequence.

A third approach involves the use of known video compression techniques. One known technique involves saving a full image, and thereafter saving only the portions of subsequent images which differ from the full image. However, in a real-time application, special purpose compression hardware and/or temporal and spatial sampling may be required, in order for the system to be able to compress video information at least as fast as it is being generated. Special purpose hardware may also be required to decompress the image information, if the decompressed image information must be provided on a real-time basis.

Thus, although each of these known approaches has been generally adequate for its intended purposes, each has at least one associated disadvantage. Consequently, these known approaches have not been satisfactory in all respects.

SUMMARY OF THE INVENTION

From the foregoing, it may be appreciated that a need has arisen for a method and apparatus for effecting transmission and/or storage of image information using a reduced number of bytes, while providing temporal and spatial resolution sufficient to permit a human operator to easily identify a person and what the person is doing, and to permit accurate automated analysis using known motion segmentation techniques. According to the present invention, a method and apparatus are provided to address this need, and involve: detecting a first image of selected subject matter; thereafter detecting a second image of the selected subject matter; identifying a region of the second image which is of interest; and preparing compressed image information which includes the first image, which includes information corresponding to the region of interest in the second image, and which excludes at least a portion of the second image. The information which corresponds to the region of interest in the second image is free of contrast information from a substantial portion of the region of interest in the second image.

BRIEF DESCRIPTION OF THE DRAWINGS

A better understanding of the present invention will be realized from the detailed description which follows, taken in conjunction with the accompanying drawings, in which:

FIGS. 2A, 2B, 2C, 2D, 2E, 2F and 2G are diagrammatic views of two-dimensional images that represent successive steps carried out by the system of FIG. 1 when processing images obtained from an image detector;

FIG. 3 is a diagrammatic view of a region of interest shown in FIG. 2G, superimposed on a reference image which is shown in FIG. 2A;

DETAILED DESCRIPTION OF THE INVENTION

Figure 1:
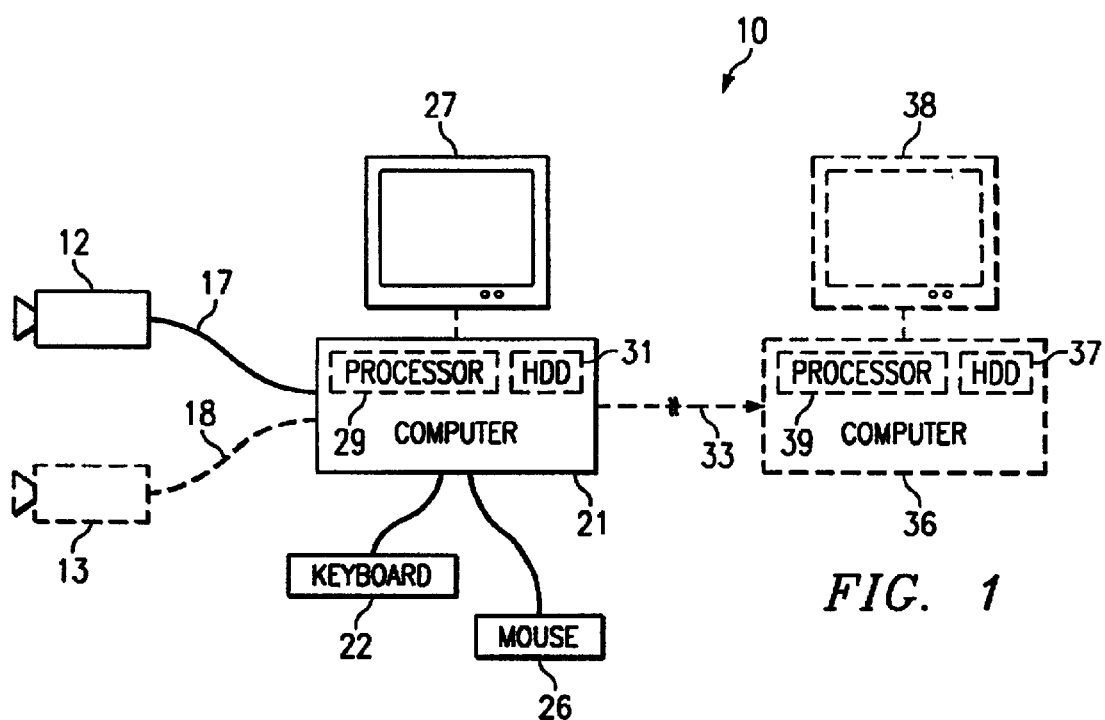
FIG. 1 is a diagrammatic view of an automatic monitoring system which embodies the present invention.

FIG. 1 is a diagrammatic view of a system 10 which embodies the present invention. In the disclosed embodiment, the system 10 is configured for use in a surveillance or monitoring application. For example, the system may be used to monitor a room or similar area in order to create a record of activity which occurs therein. However, it will be recognized that there are other applications in which the system 10 can be utilized.

The system 10 includes an image detector 12, which in the disclosed embodiment is a video camera. The image detector 12 detects and outputs a series of two-dimensional video images. In the disclosed embodiment, the image detector 12 is responsive to visible light, and generates gray scale images, rather than color images. However, the present invention is equally suitable for use with an image detector which detects radiation in a waveband other than the visible spectrum, and/or which generates color images.

The system 10 may optionally include a further image detector 13. Since the image detector 13 is optional, it is shown in broken lines in FIG. 1, rather than in solid lines. The image detector 13 is responsive to infrared radiation, and thus may include a staring array infrared detector. However, the image detector 13 could alternatively be responsive to something other than infrared radiation.

The image detectors 12 and 13 are coupled by respective output cables 17 and 18 to a computer 21. In the disclosed embodiment, the computer 21 may be a personal computer of a known type. A keyboard 22 and a mouse 26 are coupled to the computer 21, in order to facilitate user input. Further, a cathode ray tube (CRT) display 27 is coupled to the computer 21, in order to facilitate a display of information for a user.

The computer 21 includes a known type of processor 29, such as an X86-compatible microprocessor. Further, the computer 21 includes a hard disk drive (HDD) 31. The computer 21 may optionally be coupled by a cable 33 to another remote computer, which is shown diagrammatically in broken lines at 36. The remote computer 36 is coupled to a CRT display 38, and includes a processor 39 and a hard disk drive 37.

The image detector 12 outputs a series of gray scale video images to the computer 21. The initial processing of these video images by the computer 21 will now be described with reference to FIGS. 2A–2G. More specifically, FIG. 2A is a diagrammatic view of a video image produced by the image detector 12 when it is directed toward an area which, in this example, has arbitrarily been selected to be the corner of a room. The video image of FIG. 2A is maintained as a reference image.

FIG. 2B is a similar video image, obtained from the detector 12 at a later point in time, after an object has been introduced into the area being monitored. In this example, the object is a person 41, who has walked into the corner of the room and thus into the field of view of the image detector 12. The image detector 12 is stationary, and thus the single difference between the images of FIGS. 2A and 2B is the presence of the person 41 in FIG. 2B. The presence of the person 41 is detected in the following manner.

First, the gray scale image of FIG. 2B is subtracted from the gray scale image of FIG. 2A, on a pixel-by-pixel basis. The absolute value of the difference for each pixel is then determined, and the result is the gray scale difference image of FIG. 2C. Then, the difference image of FIG. 2C is sub-sampled in order to reduce the number of pixels, for example to a 128 by 128 or 256 by 256 pixel image. The resulting low-resolution image is shown in FIG. 2D. It will be recognized that it is alternatively possible to sub-sample each of the images of FIGS. 2A and 2B before determining the difference and absolute value for each pixel, which reduces the number of pixels that need to be processed, and therefore reduces the amount of time needed to obtain the image of FIG. 2D.

The low-resolution difference image of FIG. 2D is then thresholded. In other words, the gray scale value for each pixel in the image of FIG. 2D is compared to a predetermined threshold, and is then set to be either on or off (black or white), depending on whether the value is above or below the threshold. The resulting threshold image is shown in FIG. 2E. Each pixel in the threshold image of FIG. 2E can be represented by a binary "1" or a binary "0", depending on whether the pixel is considered to be on or off. An image such as that shown in FIG. 2E is therefore sometimes referred to as a "binary" image.

Morphological processing is then carried out on each pixel of the threshold image of FIG. 2E, by first performing a dilate operation, and then performing an erode operation. More specifically, each pixel is processed by viewing it as the center pixel in a three-by-three matrix of pixels. During the dilate operation for each pixel in the threshold image of FIG. 2E, if any one of the eight neighboring pixels in that image is a logic "1", the pixel of interest is set to a logic "1". The resulting dilate image is shown in FIG. 2F. During the subsequent erode operation for each pixel in the dilate image of FIG. 2F, if any one of the eight neighboring pixels in that image is a logic "0", then the pixel of interest is set to a logic "0". The result is the erode image of FIG. 2G. It should be added that the morphological processing (dilation and erosion) just discussed with reference to FIGS. 2E through 2G is optional.

The erode image of FIG. 2G is then analyzed to identify each contiguous region of logic "1" pixels. Each such contiguous region represents a change region, corresponding to an object which has been introduced in the image of FIG. 2B and which was not present in the image of FIG. 2A. One example of such an object is the person 41. This analysis can be carried out using known techniques, such as run-length encoding followed by connected-component analysis.

It is optionally possible to also carry out an identification analysis, in an attempt to identify a detected object. For example, with a small amount of knowledge about the topography of the monitored area, the computer 21 can use the position in the image of the lowermost point of an object in order to identify how far the object is from the camera. Then, knowing how tall a person that far from the camera would be, the computer 21 can evaluate the vertical height of the object in the image, in order to determine whether the object generating the change region is tall enough to be a person. If the object is sufficiently tall to be a person, then it is assumed that the object is a person.

If the object is not sufficiently tall to be a person, then the computer 21 may carry out an object analysis procedure, by analyzing the image of the object in an attempt to classify it as one of several common objects, such as a briefcase, a notebook, a box, or a computer monitor. If the object is not specifically identified through this approach, then it is ultimately identified as an "unknown" object.

According to the present invention, video information from the image detector 12 may be compressed in the following manner in order to obtain compressed image information. First, the computer 21 selects and saves a high-resolution video image provided by the image detector 12, which will thereafter serve as a reference image. For the sake of example, it is assumed here that the reference image is the reference image shown in FIG. 2A. The computer 21 stores this reference image in a high-resolution format on the hard disk drive 31. For each subsequent video image produced by the image detector 12, the computer 21 carries out, relative to the saved reference image, processing which is analogous to that described above in association with FIGS. 2B–2G.

The computer 21 then saves on the hard disk drive 31 a selected portion of the erode image of FIG. 2G, namely the portion which represents a change from the reference image of FIG. 2A. In other words, the computer 21 saves just the portion of the erode image of FIG. 2G which corresponds to the person 41 (FIG. 2B). Further, since the portion of the erode image of FIG. 2G which is saved corresponds to a single color, the amount of memory required to save the selected portion of the erode image is substantially reduced over the amount of memory which would be required to save the same portion of the erode image in a gray scale format. In fact, since the portion of the image which is being saved corresponds to a single color (black or white), it is possible to store only an identification of this portion of the image, without any contrast information, or in other words without any gray scale or color information.

Thus, for each video image generated subsequent to the saved reference image, the computer 21 will carry out processing analogous to that described in association with FIGS. 2B–2G, and then will save only an identification of the portion of the resulting erode image which represents differences from the saved reference image. The saved reference image, and the saved identification of a change or motion portion of each subsequent image, collectively represent compressed image information.

In order to uncompress and display this compressed image information, which is stored on the hard disk drive 31, the computer 21 would reconstruct each video image by displaying the saved reference image (which in this example is the reference image of FIG. 2A), and by then overlaying on the reference image a region in a single solid color which is based on the saved information identifying a change region (which in this example was derived from the erode image of FIG. 2G). The resulting reconstructed image would appear on the display 27 as shown in FIG. 3.

Since the compressed image information does not include gray scale or color information, except for the reference image, the person or other object will appear in the reconstructed image in a solid color such as black or white. Nevertheless, as successive images are reconstructed and displayed, it is possible to easily distinguish a person from some other object such as a briefcase, and to see the person walking or otherwise moving within the monitored area. In most cases, it is possible to determine with a relatively high degree of accuracy where the person went in the monitored area and what the person did. In many surveillance and/or security applications, this is more than adequate to satisfy the needs for which the system is provided.

As an example of the efficiency of this approach, consider a sequence of 243 frames or images, each of which has an uncompressed storage requirement of 16437 bytes. If the uncompressed, high-resolution information for every one of the 243 images was stored, it would require 243·16437=3, 994,191 bytes to store the entire sequence. In contrast, if the first of the 243 images was stored at full resolution, it would require 16437 bytes. By then storing only an identification of the portions of the other 242 images which are different from the reference image, the total amount of storage required for the change regions from all of the 242 images might be about 47610 bytes. Thus, the total memory required for the entire sequence would be about 16437+47610=64047 bytes. The resulting compression ratio for this particular example is thus 62:1. Of course, the exact compression ratio will vary from situation to situation, depending on how many subsequent images are associated with a given reference image, and depending on the extent to which the images subsequent to the reference image differ from the reference image. If the differences with respect to the reference image are infrequent and minimal, as is often the case in a surveillance context, the amount of information stored will be very minimal, and the effective compression ratio will be very high.

The compression ratio discussed above can be further improved by supplementing the compression technique according to invention with certain known compression techniques. For example, the reference image could be JPEG compressed from 16437 bytes to 3068 bytes, and the information for the other 242 images could be Lempel-Ziv compressed from 47610 bytes to 20777 bytes, for a total of 3068+20777=23845 bytes for the entire 243 frame sequence. This represents an effective overall compression ratio of 170:1 with respect to the raw video data of 3,994,191 bytes.

Figure 4:
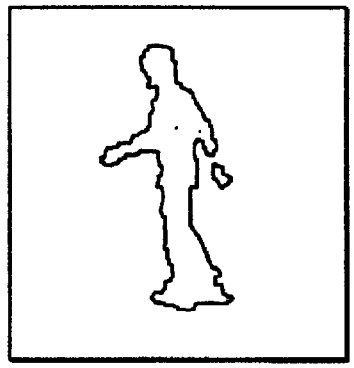
FIG. 4 is a diagrammatic view of the outline of a the region of interest shown in FIG. 2G.
Figure 5:
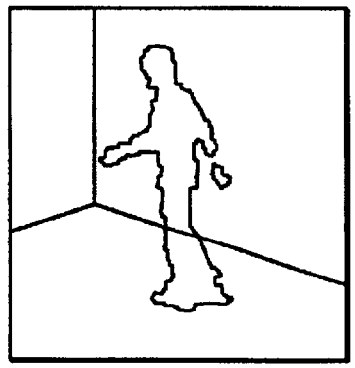
FIG. 5 is a diagrammatic view of the outline of FIG. 4, superimposed on the reference image which is shown in FIG. 2A.

As an alternative to saving the identification of the entire change region for an object, as discussed above in association with FIG. 2G, it would be possible to save only a outline of this change region. For example, FIG. 4 depicts the outline of the change region shown in FIG. 2G. Existing MPEG-4 compression standards provide excellent efficiency in storing outlines. When a particular image from the compressed image information on the hard disk drive 31 is subsequently reconstructed, by overlaying the outline over the high-resolution reference image, it will appear as shown in FIG. 5. There is no gray scale or color information for any particular object or person, but it is still possible from the displayed outline to readily distinguish a person from some other object such as a briefcase, and to determine where the person moves and what the person does.

Figure 6:
FIG. 6 is a diagrammatic view of a region derived from the image of FIG. 2B, one part of which includes gray scale information, and a further part of which does not.

As discussed above, there are many applications in which the change region for a person or other object can be adequately represented without saving contrast information such as color or gray scale information. However, there are a few applications in which it may be advantageous to provide contrast information (color or gray scale information) for a limited portion of the region of interest. For example, where an object of interest is a person, it may be desirable to have a gray scale or color image of the person's face. As discussed above, the computer 21 has the capability to make a determination of whether or not an object is a person. If it is determined that an object is a person, then the computer 21 can save gray scale or color information only as to an upper portion of the change region corresponding to that object, and can save only an identification of the remainder of the change region, without gray scale or color information. In the present example, this would result in saving the information which is shown in FIG. 6. Since a portion of this information is a gray scale image, it will require more storage space than simply identifying the change region indicated by the erode image of FIG. 2G, or the outline of this change region shown in FIG. 4. Nevertheless, it will still require substantially less storage space than would be needed to save the entire video image, or to save just the change region with contrast information for the entire change region.

Figure 7:
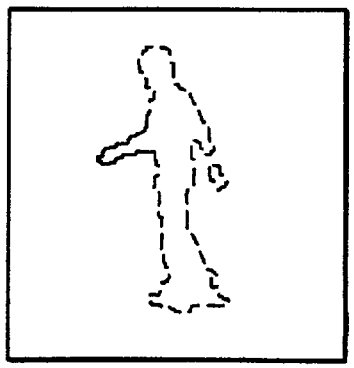
FIG. 7 is a diagrammatic view representing the differences between two successively detected images.

As still another variation, the computer 21 could save a high-resolution reference image, but then compare each subsequent image only to the image immediately before it. The information saved for the current image would represent only the differences from the immediately proceeding image, rather than all differences relative to the reference image. In the specific example shown in the drawings, if the person 41 in FIG. 2B was slowly raising his right arm, but otherwise remaining motionless, the only difference between the current image and the immediately proceeding image would be some changes associated with movement of the right arm, for example as shown in solid lines in FIG. 7. Obviously, the information required to define this change region is substantially less than the information that would be required to define the change region corresponding to the entire person. As a result, the overall amount of memory required to store the compressed image information is very small.

When this compressed image information is being reconstructed for display, a representation of the change region would be maintained in memory, and would be modified slightly as each successive image was decompressed for display. In the present example, the image of the change region being maintained in memory would at some point correspond generally to the region designated by broken lines in FIG. 7. When the information corresponding to the solid lines in FIG. 7 was retrieved, the image maintained in memory would be modified based on the information shown in solid lines, after which the display of the current image would be effected by displaying the reference image of FIG. 2A and by then using the information maintained in memory to overlay on the displayed reference image a region corresponding to the broken lines in FIG. 7, in order to obtain an overall image which would appear much like FIG. 3.

Under certain circumstances, it may be necessary to periodically save a new reference image. For example, with reference to FIG. 2A, a person may walk into the room, deposit a briefcase or other object, then walk out. Absent a new reference image, the briefcase would be detected indefinitely as a change region relative to the reference image, requiring the storage of a substantial amount of information over time, in an attempt to monitor an object which no longer needs to be observed or monitored. Accordingly, if the computer 21 determines that there is an existing difference from the reference image but that there has been no change in the current images for a predetermined period of time, for example five minutes, then at the end of this predetermined time interval the computer 21 saves a new reference image, and then analyzes all subsequently detected images relative to the new reference image rather than the original reference image.

The techniques described above all rely solely on the video images produced by the image detector 12, which is a video camera. As discussed above, the system 10 may optionally include a further image detector 13, which in the disclosed embodiment is an infrared image detector. The image detectors 12 and 13 are, of course, appropriately aligned, so that the images detected by each are in alignment with each other. A video image from the image detector 12 would be selected and saved on the hard disk drive 31, to serve as a video reference image. At the same time, an infrared image from the image detector 13 would be temporarily saved within the computer 21 as an infrared reference image, but would not necessarily be stored on the hard disk drive 31 as part of the compressed image information. Subsequent infrared images from the image detector 13 would then be compared to the reference infrared image, in a manner analogous to that described above for video images in association with FIGS. 2A–2G. When infrared images are processed in this manner, the identified change regions are, of course, those corresponding to temperature differences, which most typically represent the presence of a human or animal, rather than some other type of object such as a briefcase.

Information identifying each detected change region in each infrared image is then stored on the hard disk drive 31. When the compressed image information is to be reconstructed, the saved reference image (which is a video image) is displayed, and then the saved information identifying the detected change region from the infrared image is used to reconstruct the change region and to overlay the change region on the reference video image. The resulting composite image will be very similar to the image shown in FIG. 3.

The foregoing examples each discuss saving the compressed image information on the hard disk drive 31 of the computer 21. However, it will be recognized that the computer 21 could take some different action with this compressed image information. For example, the computer 21 could transmit the compressed image information across the cable 33 to the computer 36, and the computer 36 could then display the information on the display 38, and/or store the information on the hard disk drive 37.

The present invention provides a number of technical advantages. One such technical advantage is that the high-resolution reference image in the compressed image information provides a detailed context for surveillance, while the information saved from subsequent images provides high temporal resolution with the use of a relatively small number of bytes. The high temporal resolution permits a human to observe the reconstructed images, and to easily determine when a person is present in the monitored area, and what that person is doing. A further technical advantage is that decompression and display can be efficiently handled by a low-cost, general-purpose computer. Still another advantage is that the saved information which identifies change regions relative to the reference image contains sufficient information to permit automated motion analysis to be carried out using known techniques.

Although the foregoing disclosure presents several related techniques which are all encompassed by the present invention, it will be recognized that it is possible to make changes, substitutions and alterations in these techniques without departing from the spirit and scope of the present invention, as defined by the following claims.

What is claimed is:

1. A method of compressing video information comprising the steps of:

detecting a time series of images of a selected view;

storing a reference image of the selected view;

preparing compressed image information including the reference image and a time series of compressed images, each compressed image corresponding to a difference between a corresponding image of the time series and the reference image, each compressed image free of contrast information;

storing the compressed image information in a non-volatile storage medium; and displaying the compressed image information in a time series of display images, each display image including of a corresponding compressed image free of contrast information overlain upon corresponding pixels of the reference image in a solid color.

2. The method of claim 1, wherein:

said step of preparing compressed image information includes:

sub-sampling the reference image thereby forming a sub-sampled reference image, sub-sampling each image of the time series of images thereby forming a time series of sub-sampled images, forming an absolute difference image from the absolute difference of an image attribute between each pixel of the sub-sampled reference image and the corresponding pixel of time series of sub-sampled images, and thresholding the absolute difference image by assigning a first value to each pixel absolute difference less than a predetermined threshold and a second value different from the first value to each pixel absolute difference greater than the predetermined threshold.

3. The method of claim 1, wherein:
said step of preparing compressed image information includes:
forming an absolute difference image from the absolute difference of an image attribute between each pixel of the reference image and the corresponding pixel of time series of images,
sub-sampling the absolute difference image thereby forming a sub-sampled absolute difference image, and
thresholding the sub-sampled absolute difference image by assigning a first value to each pixel absolute difference less than a predetermined threshold and a second value different from the first value to each pixel absolute difference greater than the predetermined threshold.

4. The method of claim 1, wherein:
said step of preparing compressed image information includes:
forming an absolute difference image from the absolute difference of an image attribute between each pixel of the reference image and the corresponding pixel of time series of images,
thresholding the absolute difference image by assigning a first value to each pixel absolute difference less than a predetermined threshold and a second value different from the first value to each pixel absolute difference greater than the predetermined threshold, and
determining an outline of the thresholded absolute difference image between pixels having the first value and pixels having the second value.

5. The method of claim 1, further comprising the step of:
transmitting the compressed image information to a remotely located computer.

6. A method of compressing video information comprising the steps of:
detecting a time series of images of a selected view;
storing a reference image of the selected view;
preparing compressed image information including the reference image and a time series of compressed images, each compressed image corresponding to a difference between a corresponding image of the time series and the reference image, each compressed image free of contrast information;
transmitting the compressed image information to a remotely located computer; and
displaying the compressed image information in a time series of display images, each display image including of a corresponding compressed image free of contrast information overlain upon corresponding pixels of the reference image in a solid color.

7. The method of claim 6, wherein:
said step of preparing compressed image information includes:
sub-sampling the reference image thereby forming a sub-sampled reference image,
sub-sampling each image of the time series of images thereby forming a time series of sub-sampled images,
forming an absolute difference image from the absolute difference of an image attribute between each pixel of the sub-sampled reference image and the corresponding pixel of time series of sub-sampled images, and
thresholding the absolute difference image by assigning a first value to each pixel absolute difference less than a predetermined threshold and a second value different from the first value to each pixel absolute difference greater than the predetermined threshold.

8. The method of claim 6, wherein:
said step of preparing compressed image information includes:
forming an absolute difference image from the absolute difference of an image attribute between each pixel of the reference image and the corresponding pixel of time series of images,
sub-sampling the absolute difference image thereby forming a sub-sampled absolute difference image, and
thresholding the sub-sampled absolute difference image by assigning a first value to each pixel absolute difference less than a predetermined threshold and a second value different from the first value to each pixel absolute difference greater than the predetermined threshold.

9. The method of claim 6, wherein:
said step of preparing compressed image information includes:
forming an absolute difference image from the absolute difference of an image attribute between each pixel of the reference image and the corresponding pixel of time series of images,
thresholding the absolute difference image by assigning a first value to each pixel absolute difference less than a predetermined threshold and a second value different from the first value to each pixel absolute difference greater than the predetermined threshold, and
determining an outline of the thresholded absolute difference image between pixels having the first value and pixels having the second value.

10. The apparatus of claim 6, wherein:
said computer is further programmed to prepare said compressed image information by
determining if an object corresponds to a person,
selecting an upper portion of the object as the first region if the object is determined to be a person, and
selecting a lower portion of the object exclusive of the upper portion as the second region if the object is determined to be a person.

11. A method of compressing video information comprising the steps of:
detecting a time series of images of a selected view;
storing a reference image of the selected view;
preparing compressed image information including the reference image and a time series of compressed images by
forming an absolute difference image from the absolute difference of an image attribute between each pixel of the reference image and the corresponding pixel of time series of images,
thresholding the absolute difference image by assigning a first value to each pixel absolute difference less than a predetermined threshold and a second value different from the first value to each pixel absolute difference greater than the predetermined threshold, and
determining an outline of the thresholded absolute difference image between pixels having the first value and pixels having the second value.

12. The method of claim 11, further including the step of:
displaying the compressed image information in a time series of display images, each display image including of a corresponding compressed image overlain upon the reference image in a solid color.

13. The method of claim 11, further comprising the step of:
   storing the compressed image information in a non-volatile memory.

14. The method of claim 11, further comprising the step of:
   transmitting the compressed image information to a remotely located computer.

15. A method of compressing video information comprising the steps of:
   detecting a time series of images of a selected view;
   storing a reference image of the selected view;
   preparing compressed image information including the reference image and a time series of compressed images by:
      forming an absolute difference image from the absolute difference of an image attribute between each pixel of the reference image and the corresponding pixel of time series of images,
      thresholding the absolute difference image by assigning a first value to each pixel absolute difference less than a predetermined threshold and a second value different from the first value to each pixel absolute difference greater than the predetermined threshold,
      identifying within each of said time series of images each object of a contiguous region of pixels which differ from corresponding pixels of the reference image, and
      forming a compressed image for at least one identified object having a first region consisting of pixels of the absolute difference image and a second region of pixels of the thresholded absolute difference image.

16. The method of claim 15, further including the step of:
   displaying the compressed image information in a time series of display images, each display image including of a corresponding compressed image for the at least one identified object overlain upon corresponding pixels of the reference image, the first region in a plurality of colors and the second region in a solid color.

17. The method of claim 15, wherein:
   said step of preparing compressed image information includes
      determining if an identified object corresponds to a person,
      selecting an upper portion of the object as the first region if the object is determined to be a person, and
      selecting a lower portion of the object exclusive of the upper portion as the second region if the object is determined to be a person.

18. The method of claim 11, wherein:
   said step of determining if an identified object corresponds to a person includes
      determining a bottom location of the object within the corresponding image of the time series of images,
      determining a top of the object within the corresponding image of the time series of images,
      estimating a height of the object from the bottom location, predetermined geometry of the selected view, and the top of the object,
      determining the object to be a person if the estimated height is within a predetermined range of heights.

19. An apparatus for compressing video information comprising:
   an image detector generating a time series of images of a selected view;
   a non-volatile memory;
   a display device; and
   a computer connected to said image detector, said non-volatile memory and said display device, said computer programmed to
      store a reference image of the selected view in said non-volatile memory,
      generate compressed image information including said reference image and a time series of compressed images, each compressed image corresponding to a difference between a corresponding image of said time series and said reference image, each compressed image free of contrast information,
      store said compressed image information in said non-volatile memory, and
      display the compressed image information in a time series of display images via said display device, each display image including of a corresponding compressed image free of contrast information overlain upon corresponding pixels of the reference image in a solid color.

20. The apparatus of claim 19, wherein:
   said computer is programmed to prepare said compressed image information by
      sub-sampling the reference image thereby forming a sub-sampled reference image,
      sub-sampling each image of the time series of images thereby forming a time series of sub-sampled images,
      forming an absolute difference image from the absolute difference of an image attribute between each pixel of the sub-sampled reference image and the corresponding pixel of time series of sub-sampled images, and
      thresholding the absolute difference image by assigning a first value to each pixel absolute difference less than a predetermined threshold and a second value different from the first value to each pixel absolute difference greater than the predetermined threshold.

21. The apparatus of claim 19, wherein:
   said computer is programmed to prepare said compressed image information by
      forming an absolute difference image from the absolute difference of an image attribute between each pixel of the reference image and the corresponding pixel of time series of images,
      sub-sampling the absolute difference image thereby forming a sub-sampled absolute difference image, and
      thresholding the sub-sampled absolute difference image by assigning a first value to each pixel absolute difference less than a predetermined threshold and a second value different from the first value to each pixel absolute difference greater than the predetermined threshold.

22. The apparatus of claim 19, wherein:
   said computer is programmed to prepare said compressed image information by
      forming an absolute difference image from the absolute difference of an image attribute between each pixel of the reference image and the corresponding pixel of time series of images,
      thresholding the absolute difference image by assigning a first value to each pixel absolute difference less than a predetermined threshold and a second value different from the first value to each pixel absolute difference greater than the predetermined threshold, and determining an outline of the thresholded absolute difference image between pixels having the first value and pixels having the second value.

23. The apparatus of claim 19, wherein:

said computer is further programmed to transmit the compressed image information to a remotely located computer.

24. An apparatus for compressing video information comprising:

an image detector generating a time series of images of a selected view;

a non-volatile memory; and a computer connected to said image detector and said non-volatile memory, said computer is programmed to form an absolute difference image from the absolute difference of an image attribute between each pixel of the reference image and the corresponding pixel of time series of images, threshold the absolute difference image by assigning a first value to each pixel absolute difference less than a predetermined threshold and a second value different from the first value to each pixel absolute difference greater than the predetermined threshold, identify within each of said time series of images each object of a contiguous region of pixels which differ from corresponding pixels of the reference image, and form a compressed image for at least one identified object having a first region consisting of pixels of the absolute difference image and a second region of pixels of the thresholded absolute difference image.

25. The apparatus of claim 19, further comprising:

a display device; and said computer is further programmed to display the compressed image information in a time series of display images via said display device, each display image including of a corresponding compressed image for the at least one identified object overlain upon corresponding pixels of the reference image, the first region in a plurality of colors and the second region in a solid color.

26. The apparatus of claim 24, wherein:

said computer is further programmed to transmit the compressed image information to a remotely located computer.

* * * * *